US009438677B2

(12) United States Patent
Leung et al.

(10) Patent No.: US 9,438,677 B2
(45) Date of Patent: Sep. 6, 2016

(54) METHOD AND APPARATUS FOR ANALYSIS OF USER TRAFFIC WITHIN A PREDEFINED AREA

(71) Applicant: Euclid Inc., San Francisco, CA (US)

(72) Inventors: Kenneth Man-Kin Leung, Sunnyvale, CA (US); William Tolbert Smith, Mountain View, CA (US); Steve Lawrence Wilhelm, Los Altos, CA (US)

(73) Assignee: Euclid Inc., San Francisco, CA (US)

( * ) Notice: Subject to any disclaimer, the term of this patent is extended or adjusted under 35 U.S.C. 154(b) by 0 days.

(21) Appl. No.: 14/253,787

(22) Filed: Apr. 15, 2014

(65) Prior Publication Data

US 2014/0229616 A1 Aug. 14, 2014

Related U.S. Application Data

(63) Continuation of application No. 13/216,201, filed on Aug. 23, 2011, now Pat. No. 8,699,370.

(60) Provisional application No. 61/376,616, filed on Aug. 24, 2010.

(51) Int. Cl.
| | |
|---|---|
| *H04B 7/00* | (2006.01) |
| *H04L 29/08* | (2006.01) |
| *G01S 5/00* | (2006.01) |
| *G01S 5/02* | (2010.01) |
| *G06Q 10/06* | (2012.01) |
| *G06Q 50/30* | (2012.01) |
| *H04W 4/00* | (2009.01) |

(Continued)

(52) U.S. Cl.
CPC .............. *H04L 67/12* (2013.01); *G01S 5/0009* (2013.01); *G01S 5/0294* (2013.01); *G06Q 10/063* (2013.01); *G06Q 50/30* (2013.01); *H04W 4/006* (2013.01); *H04W 4/02* (2013.01); *H04W 64/00* (2013.01)

(58) Field of Classification Search
CPC ..... H04W 4/02; H04W 24/08; H04W 4/021; H04W 4/028; H04W 64/00
USPC ........................................ 370/252, 310, 389
See application file for complete search history.

(56) References Cited

U.S. PATENT DOCUMENTS

| | | | | |
|---|---|---|---|---|
| 7,675,863 | B2 | 3/2010 | Werb et al. | |
| 7,706,369 | B2 * | 4/2010 | Roese | ....................... G01S 5/02 370/389 |
| 8,326,315 | B2 * | 12/2012 | Phillips | .............. G08B 21/0236 348/552 |

(Continued)

OTHER PUBLICATIONS

PCT International Search Report and Written Opinion for PCT/US2011/049016, mailed Feb. 29, 2012, 10 pages.

*Primary Examiner* — Dang Ton
*Assistant Examiner* — Sai Aung
(74) *Attorney, Agent, or Firm* — Van Pelt, Yi & James LLP

(57) ABSTRACT

Multiple packets are received that were transmitted by multiple mobile electronic device sensors located in a predefined area. The packets each include data detected by the sensors of multiple mobile electronic devices. At least a portion of the collected data is stored including multiple unique device identifiers that belong to multiple mobile electronic devices. Responsive to determining that at least two of the unique device identifiers are sequential, a set of values based on the at least two unique devices identifiers are associated as belonging to a same one of the mobile electronic devices.

14 Claims, 14 Drawing Sheets

(51) Int. Cl.
*H04W 4/02* (2009.01)
*H04W 64/00* (2009.01)

(56) References Cited

U.S. PATENT DOCUMENTS

| | | |
|---|---|---|
| 2002/0186135 A1 | 12/2002 | Wagner |
| 2004/0130438 A1* | 7/2004 | Garber ............... G06K 7/10029 340/10.2 |
| 2006/0171325 A1* | 8/2006 | Jung ..................... H04W 4/02 370/252 |
| 2007/0030824 A1 | 2/2007 | Ribaudo et al. |
| 2007/0178911 A1* | 8/2007 | Baumeister ............. G01S 1/022 455/456.1 |
| 2007/0258395 A1 | 11/2007 | Jollota et al. |
| 2007/0274242 A1* | 11/2007 | Lamacraft .......... G06K 19/0723 370/310 |
| 2007/0285245 A1* | 12/2007 | Djuric ................ G08B 21/0275 340/572.1 |
| 2008/0318591 A1 | 12/2008 | Oliver |
| 2009/0116400 A1* | 5/2009 | Sekiya ................ H04W 72/082 370/252 |
| 2009/0210141 A1 | 8/2009 | Young et al. |
| 2009/0215470 A1 | 8/2009 | Bowyer et al. |
| 2009/0307091 A1 | 12/2009 | Lilley |
| 2009/0310501 A1* | 12/2009 | Catovic ................ H04W 24/08 370/252 |
| 2010/0010738 A1* | 1/2010 | Cho ....................... G01C 21/36 701/532 |
| 2010/0153488 A1 | 6/2010 | Mittal et al. |
| 2011/0090907 A1 | 4/2011 | Coy et al. |

\* cited by examiner

METHOD AND APPARATUS FOR ANALYSIS OF USER TRAFFIC WITHIN A PREDEFINED AREA

CROSS-REFERENCE TO RELATED APPLICATIONS

This application is a continuation of U.S. patent application Ser. No. 13/216,201 filed Aug. 23, 2011, which claims the benefit of U.S. Provisional Patent Application No. 61/376,616, filed on Aug. 24, 2010, which is hereby incorporated by reference.

FIELD

Embodiments of the invention relate to the field of business intelligence, analytical processing, data mining, and predictive analysis; and more specifically, to a method and apparatus for analyzing user traffic within a predefined area.

BACKGROUND

People often carry on their person mobile electronic devices (e.g., mobile phones, laptops, tablets, portable media players, etc.) during their everyday life. Technology exists that is able to track the location of these devices by installing dedicated hardware or software on the device (e.g., geolocation hardware). In addition, some electronic devices can be tracked by the existing infrastructure. For example, the location of a device with a Global Positioning System (GPS) receiver may be determined through use of GPS. As another example, the location of a mobile device can be determined through the use of the cellular infrastructure.

SUMMARY

The present invention is a method and apparatus to track pedestrian traffic and analyze the data for the purposes of providing both historical and predictive behavior. In one embodiment, the invention is capable of performing one or more of the following:

Detecting the presence of signals emitted by electronic devices carried by a user;

Determines the location and time of that location of the user;

Assigns demographic attributes of the user based upon locations visited;

Predicts the next likely locations of the user;

Recommends locations of interest to the user;

Recommends objects of interest to the user; and

Measures the effectiveness of recommendations.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and/or techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
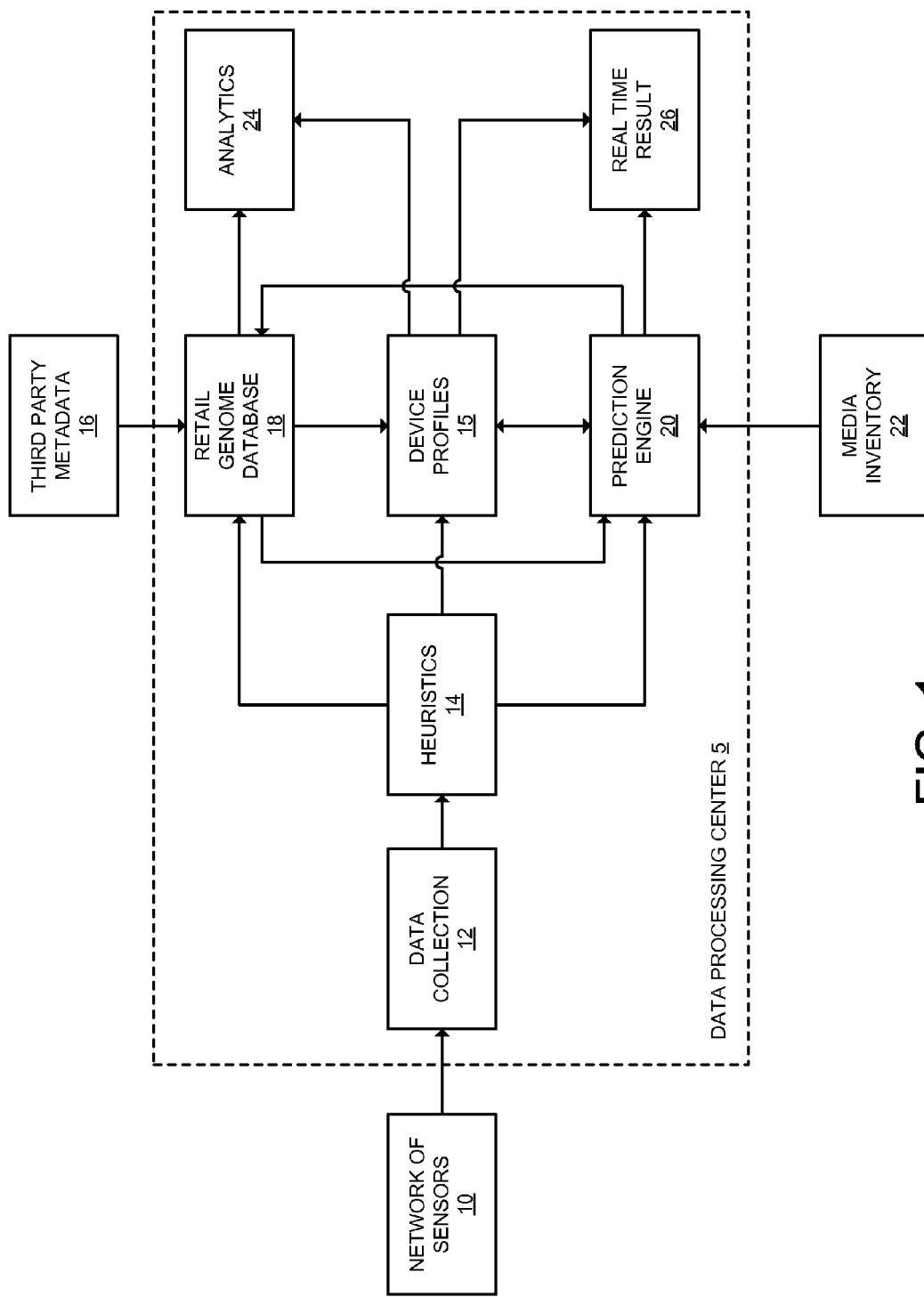
FIG. 1 illustrates the overall system architecture according to one embodiment of the invention.

FIG. 1 illustrates the overall system architecture according to one embodiment. As illustrated in FIG. 1, the system includes the following: a network of one or more sensors 10 that collects data from mobile electronic devices of pedestrians when in signal range, a data processing center 5 that includes a data collection store 12 that stores and processes the data collected by the network of sensors 10, a heuristics module 14 that processes the stored data and updates a retail genome database 18, a prediction engine 20, and device profiles 15. As used herein, the user is a person that carries a mobile electronic device. For purposes of explanation, the user is sometimes referred herein as a pedestrian. However, at least certain embodiments of the invention are also applicable to other types of users (e.g., users using a bicycle, wheelchair, skateboard, inline skates, etc.). The architecture illustrated in FIG. 1 is exemplary and other embodiments may include additional components and/or omit some of the components illustrated in FIG. 1.

The prediction engine 20 processes data from the heuristics module 14, retail genome database 18, and the media inventory 22 and sends the results to the real-time result interface 26. The analytics module 24 displays the processed data to customers of the system (e.g., retail establishments). For example, the processed data may indicate the number of people (as indicated by the number of unique devices) that visited the establishment, the amount of time people stayed in the establishment, the visitor frequency, etc. The real-time result interface 26 is a generic interface to access the processed data including the next likely set of visits for the detected devices and recommendations for locations and objects of interest. The analytics module 24 and the real-time result interface 26 may also be part of the data processing center 5.

The third party metadata 16 is a collection of generic description of data sources. The source of the third party metadata 16 is either publicly available or available through a private business agreement. The data in the third party metadata 16 may be obtained from sources such as online review sites, census data, video feeds of retail locations, etc. The third party metadata 16 may include descriptions of retail locations such as but not limited to hours of operation, demographics served, point of sales data, weather conditions, marketing events, and global and/or economic events.

The media inventory 22 is a description of advertising mediums that are potential objects of interest to the users, such as video, audio, banners, pictures, etc. As will be described in greater detail later herein, object(s) of interest are presented to users based on demographic attributes assigned to the users in some embodiments.

The device profiles 15 store profiles of the devices. Each device profile may include a set of one or more attributes including one or more of: demographic attribute information, visit history information, device information (e.g., MAC address(es), manufacturer(s), etc. (which may be encrypted)), and online identifier(s). The device profiles 15 may be used by the analytics module 24 and/or the real-time result interface 26.

In more detail, still referring to the invention of FIG. 1 the network of sensors 10 include multiple sensors that each detect wireless signals from a set of mobile electronic devices (e.g., WiFi enabled devices, cellular phones, Bluetooth enabled devices, etc. based on the capability of each sensor 10) when located in range of the sensors 10. For example, in some implementations, the network of sensors 10 are located in a predefined area such as a commerce district and detect signals from a set of mobile electronic devices when in range. The network of sensors 10 may also detect one or more access points. In some embodiments, a sensor in the network of sensors can also be an access point. In one embodiment, each sensor in the network of sensors 10 passively detects signals.

Sometime after detecting a wireless signal, each of the sensor in the network of sensors 10 transmits its collected data to the data collection 12 via a wired or wireless data communication channel. The network of sensors 10 periodically detect signals and transmit packets to the data collection 12. In one embodiment, the data is transmitted over an encrypted connection (e.g., a Secure Sockets Layer (SSL) connection).

The data collection 12 stores the data received from the network of sensors 10. The collected data from the network of sensors includes one or more of the following for each detected signal of each device: Media Access Control (MAC) address(es), signal strength, time of detection, and unique identifier (if different than the MAC address(es)).

The heuristics module 14 processes the stored data in the data collection 12 and updates both the retail genome database 18 and the prediction engine 20 with the processed data of each device collected by the network of sensors 10. This data processed by the heuristics module 14 is defined herein as "visit data." Details regarding the processing performed by the heuristics module 14 will be described in greater detail later herein with respect to FIGS. 4 and 5.

The retail genome database 18 combines the third party metadata 16 with the visit data. In one embodiment, the combined data is a log of all visits to each location specified in the third party metadata along with the demographic information of the location.

The prediction engine 20 predicts the next likely set of visits for the detected devices based on the current visit data provided by the heuristics module 14 and the log of prior visits from the retail genome database 18. Exemplary operations for predicting the next likely set of visits will be described with reference to FIG. 14. The prediction engine 20 may also determine the most likely advertisement from the media inventory 22 that matches the demographic attributes obtained by the retail genome database 18. Exemplary operations for selecting and presenting an object of interest to the user based on the demographic information associated with the user will be described with reference to FIG. 15.

Figure 2:
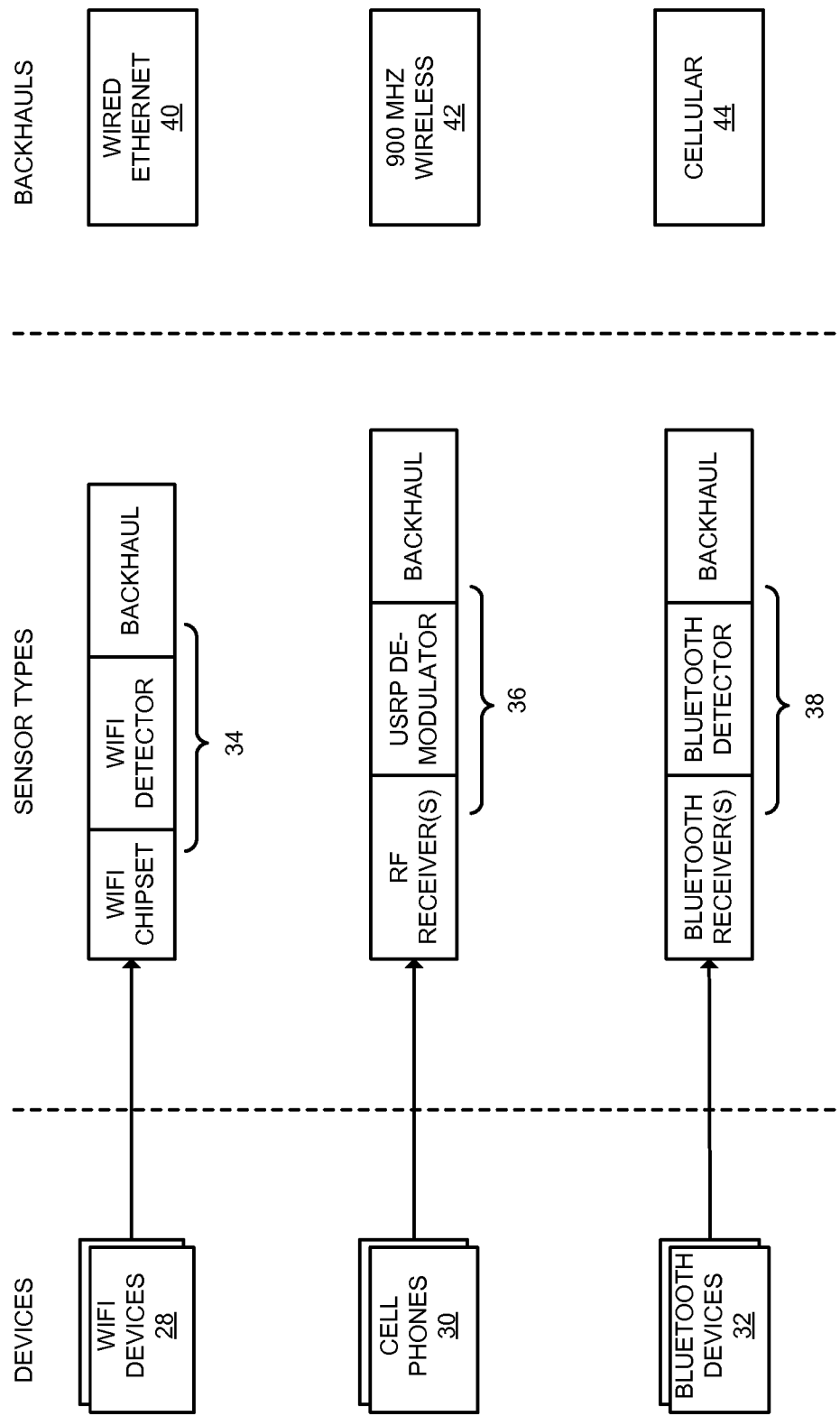
FIG. 2 illustrates the collection of data from the mobile electronic devices in more detail according to one embodiment.

FIG. 2 illustrates the collection of data from the mobile electronic devices in more detail according to one embodiment. In particular, FIG. 2 illustrates the set of mobile electronic devices tracked; the sensors used to track the mobile electronic devices; and the methods to transport the data collected by the sensors. As illustrated in FIG. 2, the set of devices that can be detected are, but not limited to: WiFi devices 28, cell phones 30 (or other mobile phone), and Bluetooth devices 32. It should be understood that a single device may have multiple detected signals. For example, a smartphone may be substantially simultaneously detected by one or more sensors through a WiFi connection, a cellular connection, and/or a Bluetooth connection, or other wireless technology of the smartphone.

The sensors 10 may include WiFi detectors 34 to detect WiFi signals from WiFi devices 28. The sensors 10 may include Radio Frequency (RF) receivers 36 that detect RF signals produced by cell phones 30. The sensors 10 may also include Bluetooth receivers 38 to detect signals produced by Bluetooth enabled devices 32. Each of the sensors 10 transmits its collected data for storage via a generic backhaul communication channel. Examples of a backhaul communication channel include, but not limited to wired Ethernet 40, 900 MHz wireless 42, and cellular 44. The sensors 10 may include the backhaul communication channel and/or may piggyback off existing or separate backhaul communication channels. In one embodiment, a sensor may include a unidirectional antenna or multidirectional antenna.

In one embodiment, the WiFi detectors 34 collect a MAC address of the WiFi component of the WiFi enabled devices 28, signal strength at time of collection, and the time of detection. In the case where signal strength is not available, the location of the detected device can be estimated based upon the range of the WiFi detectors 34 where the range value is the maximum range of the WiFi detectors 34.

In one embodiment, the RF receivers 36 collect a unique identifier of each of the Cellular enabled devices 30 (e.g., the International Mobile Subscriber Identity (IMSI) of the device, the International Mobile Equipment Identity (IMEI) of the device, the Temporary IMSI of the device, etc.), the signal strength at time of collection, and the time of detection. In the case where signal strength is not available, in one embodiment the location of the detected cellular enabled device 30 is estimated based upon the range of the RF receivers 36 where the range value is the maximum range of the RF receivers 36.

In one embodiment, the Bluetooth receivers 38 collect a MAC address of the Bluetooth component of the Bluetooth enabled devices 32, the signal strength at time of collection, and time of detection. In the case where signal strength is not available, in one embodiment the location of the detected Bluetooth enabled device 32 is estimated based upon the range of the Bluetooth detectors 38, where the range value is the maximum range of the Bluetooth detectors 38.

Figure 3:
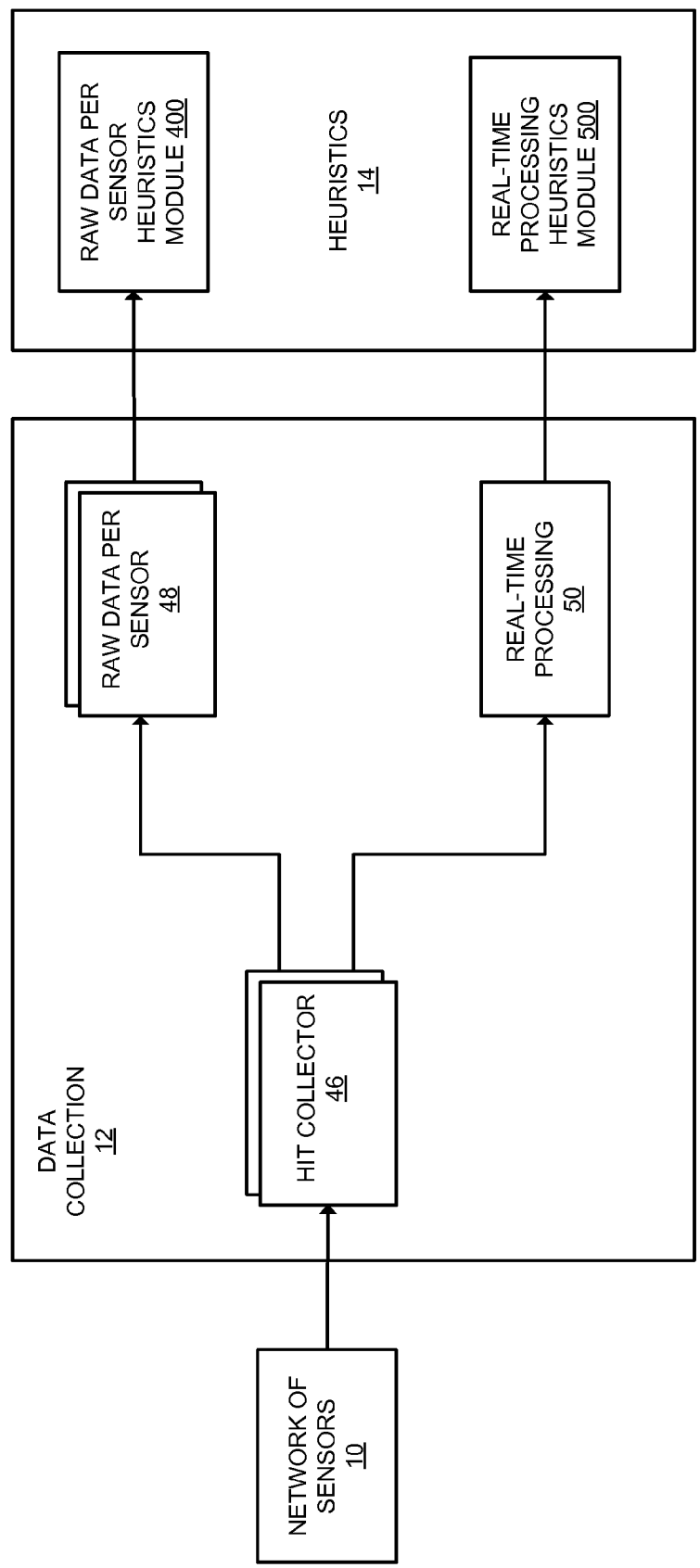
FIG. 3 illustrates the data collection procedure at the data processing center in more detail according to one embodiment.

FIG. 3 illustrates the data collection procedure at the data processing center in more detail according to one embodiment. The hit collector modules 46 are a set of one or more software modules that receive the data packets transmitted from the network of sensors 10. The hit collector modules 46 reside at the data processing center. A hit collector module 46 partitions the data packets it receives into raw data per sensor information 48 and real time processing information 50. The raw data per sensor information 48 is data collected for later processing. The real time processing information is data collected for real time processing. The raw data per sensor information is segmented by each sensor (e.g., by a sensor identifier). The hit collector module 46 transmits the real time processing information 50 if the sensor that detected the information is flagged for real time processing. In one embodiment, the raw data per sensor information 48 is processed by a first set of heuristics of the heuristics module 14 described with reference to FIG. 4 (raw data per sensor heuristics) and the real time processing information 50 is processed by a second set of heuristics of the heuristics module 14 described with reference to FIG. 5 (real time processing heuristics).

Figure 4:
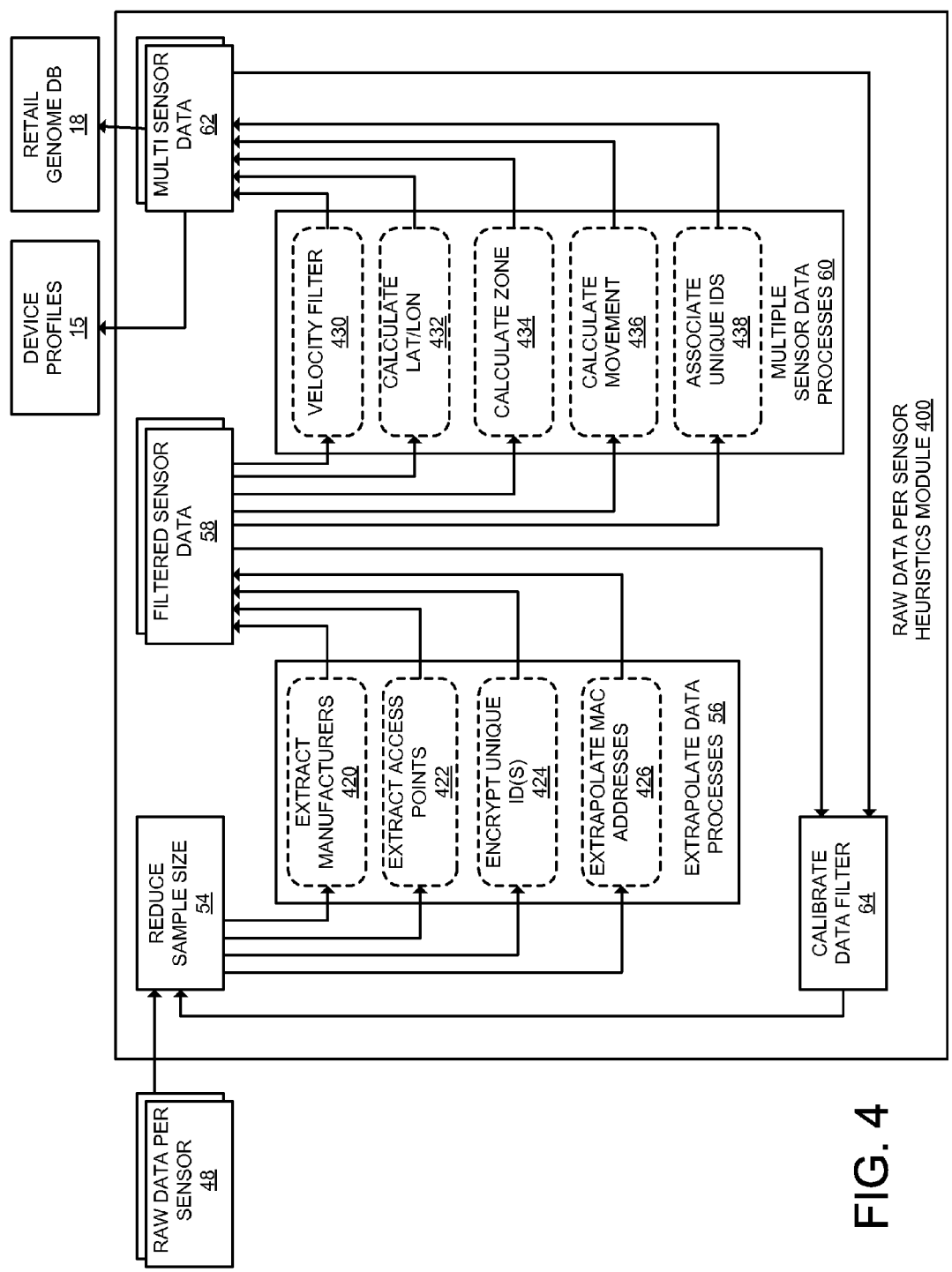
FIG. 4 illustrates a first set of operations of the heuristics module of FIG. 1 according to one embodiment.

FIG. 4 illustrates a first set of operations of the heuristics module 14 according to one embodiment, which are performed at the data processing center. In particular, the first set of operations include filtering the data from the sensors and analyzing the filtered data. The heuristics module 14 includes the raw data per sensor heuristic module 400. The raw per data per sensor heuristic module 400 includes the reduce sample size process 54, which is an optimization process to remove duplicate data. For example, the reduce sample size process 54 determines duplicate data by calculating the statistical average of the data values within a configurable window of time and removes the duplicate data accordingly.

After duplicates are removed, a set of one or more extrapolate data processes 56 are performed to extrapolate data from each raw data per sensor 48. For example, the extrapolate data process 56 may include the extract manufacturers process 420, the extract access points process 422, the encrypt unique identifier(s) process 424, and the extrapolate additional MAC addresses 426. The results of the reduced sample size process 54 and the extrapolate data process(es) 56 are stored in the filtered sensor data 58 (per sensor).

The extract manufacturers process 420 uses the first three octets of the MAC address (the Organizationally Unique Identifier (OUI)) of the detected device to determine the manufacturer of the device from the IEEE Registration Authority. The manufacture of the device may be associated with a profile associated with that device.

The extract access points process 422 extracts the access points and their signal strength data, which is used as a calibration mechanism for the dataset in the same window of time in one embodiment. An exemplary calibration mechanism will be described with reference to FIG. 9.

The encrypt unique identifier(s) process 424 encrypts (e.g., with a one-way hash) the unique identifiers (e.g., MAC addresses) of the data. While FIG. 4 illustrates encrypting the unique identifier(s) after receiving the raw data from the sensors, in other embodiments the sensors 10 encrypt the data (e.g., the unique identifiers such as the MAC addresses) and transmit the encrypted data to the data collection 12.

As described above, a device may include multiple components with multiple MAC addresses that are detected by one or more of the sensors 10. For example, a smartphone device may include a WiFi transceiver, a cellular transceiver, and/or a Bluetooth transceiver, which each may have a separate MAC address. Often, these MAC addresses are sequential in a particular device. The extrapolate additional MAC address(es) process 426 extracts and correlates MAC address(es) from the detected device and calculates a range of MAC addresses for a particular device. Exemplary operations for associating unique identifiers (e.g., MAC addresses) of a single device will be described with reference to FIG. 11.

Sometime after the data is extrapolated and stored in the filtered sensor data 58, the filtered sensor data is processed by a set of one or more multiple sensor data processes 60. For example, the multiple sensor data processes 60 may include the velocity filter process 430, the calculate latitude and longitude process 432, the calculate zone process 434, the calculate movement process 436, and the associate unique identifier process 438. The results of the multiple sensor data processes 60 are stored in the multi-sensor data store 62.

The velocity filter process 430 calculates the velocity of the pedestrian carrying/using the mobile electronic device. The velocity is calculated based upon the times multiple sensors detected the same device in a given time period. The calculate latitude and longitude process 432 calculates the latitude and longitude of the detected device. In one embodiment, the latitude and longitude calculation is based on an approximation using a Gaussian distribution of the signal strength data and applying the Haversine formula.

The calculate zone process 434 calculates and assigns a zone to a detected device. A zone is defined by a set of latitude and longitude points, which may be configurable. In one embodiment, after the position of the detected device is determined (e.g., the latitude and longitude of the detected device is determined), the calculate zone process assigns the device to the zone in which the device was located at the time of collection.

The calculate movement process 436 calculates the movement of a device in the predefined region. In one embodiment, the calculate movement process 436 uses the calculated zone(s) or the latitude/longitude points for the device to calculate the movement by associating the time of detection with the zone(s) or latitude/longitude points.

In some embodiments, known online activities from an external system are provided as input to the system described herein. For example, the online activities may include a pedestrian registering presence at a location at a certain time, a treasure hunt that guides the pedestrian to predefined locations at certain times, a pedestrian causing their device to emit predefined signal patterns at a location at a certain time. The known online activities may provide an identifier of the user associated with those activities (e.g., a username or other online identity). The associate unique identifier process 438 determines whether the online activity location and time matches a device in a location point (e.g., a zone or latitude/longitude point) in the predefined region at a similar time. If there is a match, the associate unique identifier process 438 associates the anonymized identifier(s) of the device (e.g., an encrypted MAC address of the device) with the unique identifier of the pedestrian, which may be stored in the profile associated with the device. While the associate unique identifier process 438 has been described with respect to a multiple sensor data process, in some embodiments the associate unique identifier process 438 may be performed in relation to a single sensor. Exemplary operations for associating a unique online identifier with one or more device identifiers is described with reference to FIG. 12.

Results from the filter sensor data store 58 and the multi-sensor data store 62 are used by the calibrate data filter process 64 by adjusting the time window and updating the list of access points for signal calibration.

While several exemplary extrapolate data processes 56 have been described, it should be understood that other extrapolation techniques can be applied in addition to, or in lieu of, the extrapolate data processes 56. In addition, while several exemplary multiple sensor data processes 60 have been described, it should be understood that other multiple sensor data processes can be performed in addition to, or in lieu of, the multiple sensor data processes 60. While the multiple sensor data processes 60 have been described as being performed after the extrapolate data processes 56, it should be understood that one or more of the multiple sensor data processes 60 may be performed prior to or in conjunction with one or more of the extrapolate data processes 56.

Figure 5:
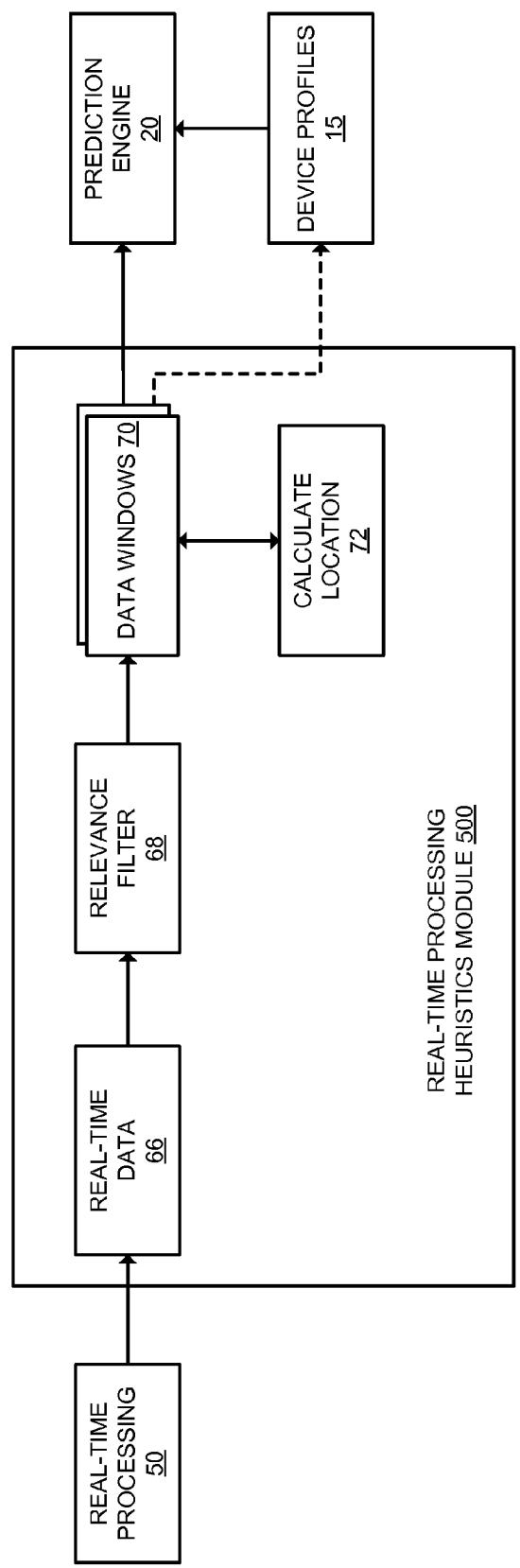
FIG. 5 illustrates a second set of operations of the heuristics module of FIG. 1 according to one embodiment.

FIG. 5 illustrates a second set of operations of the heuristics module 14 according to one embodiment, which are performed at the data processing center. In particular, the second set of operations include additional processes to filter the data from the sensor and analyze the filtered data. The heuristics module 14 includes the real-time processing heuristics module 500 that includes the real-time data process 66, the relevance filter process 68, the data windows 70, and the calculate location process 72.

The real-time data process 66 transmits all the data from all detected devices (in a given time period) to the relevance filter 68. In one embodiment, the real-time data process 66 transmits for each detected dataset, the unique identifier of the sensor that detected the data, the unique identifier(s) of the detected device (e.g., the MAC address(es) of the detected device), and the signal strength of the detected device.

The relevance filter 68 removes irrelevant data and creates the data windows 70 for further data processing. In one embodiment, the relevance filter 68 maintains a list of all sensor identifiers that desire real-time processing. By way of example, a sensor that is in close physical proximity to a video billboard, audio billboard, or other interface suitable for displaying/playing advertisements, may desire real-time processing such that it can display a selected object (e.g., a selected advertisement) to a user or a group of users in substantially real-time when a number of device(s) of the user(s) are detected near that interface. By way of another example, a customer may choose real-time processing for one or more sensors if it wants results immediately (e.g., the customer may want to be alerted in near real-time if a particular user is within the predefined area). If the data received from the real-time data process 66 does not match one of the sensor identifies that require real-time processing, the relevance filter 68 discards that data. The remaining data is segmented into the data windows 70.

The data windows 70 include a predefined sliding window of data of all the sensors of interest (e.g., those which have been identified as requiring real-time processing). In one embodiment, each of the data windows 70 retains data from a sensor for a predefined period of time (e.g., no greater than fifteen minutes). The prediction engine 20 reads the data in the data windows 70.

The calculate location process 72 reads from the data windows 70 and calculates either the zone or the latitude/longitude of the detected devices in the data windows 70. For example, in one embodiment, for each of the data windows 70, the calculation location process 72 determines the best algorithm to determine the location of each detected device in that data window and determines the location by either calculating the latitude and longitude of each detected device in that data window or by the relative position of the each detected device within a predefined zone. In one embodiment, the location is obtained by triangulating multiple signals received at multiple sensors from the same device in a predefined area. In another embodiment, the location is estimated by presence within a range of a sensor. The result of the calculate location process 72 may be stored in the profile associated with the device in the device profiles 15.

Figure 6:
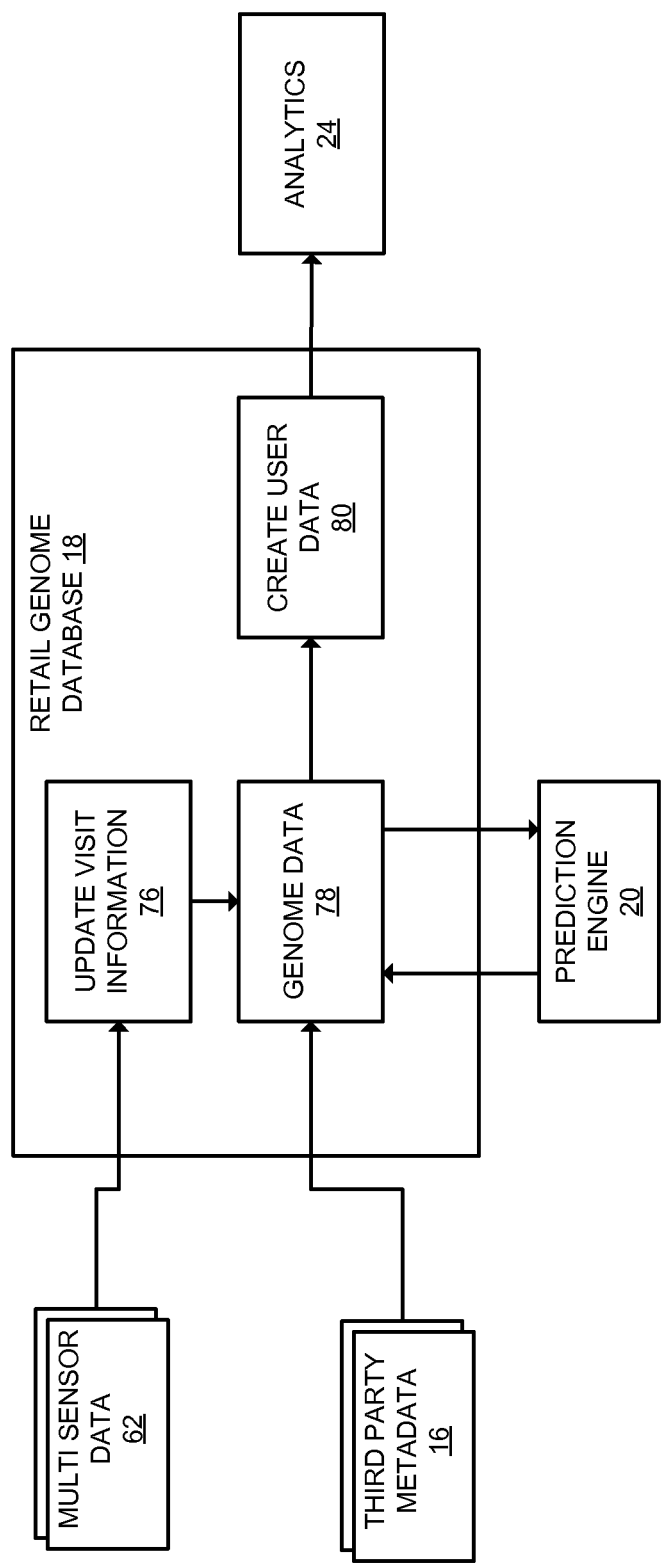
FIG. 6 illustrates the retail genome database of FIG. 1 in more detail according to one embodiment.

FIG. 6 illustrates the retail genome database 18 in more detail according to one embodiment. The retail genome database 18 includes a set of software modules that reside at the data processing center including the update visit information module 76, the genome data module 78, and the create user data module 80. The retail genome database 18 includes operations to correlate the data collected by the sensors 10 with the demographic attributes of the physical locations visited.

As described above, the third party metadata 16 includes descriptions of retail locations, such as, but not limited to, hours of operation, demographics served, point of sales data, weather conditions, marketing events, and global and/or economic events. The source of the third party metadata 16 is either publicly available or available through a private business agreement. The data in the third party metadata 16 may be obtained from sources such as online review sites, census data, video feeds of retail locations, etc. While the third party metadata 16 has been described in reference to retail establishments, in some embodiments the third party metadata 16 includes, either in addition to or in lieu of data for retail establishments, data for other types of establishments (e.g., charitable organizations, religious organizations, non-retail businesses, etc.).

The genome data module 78 consolidates the data from the third party metadata 16 sources and the results of the update visit information module 76. The genome data module 78 also records the data provided by the real-time processing heuristics module 500 via the update visit information process 76. The genome data module 78 is also an interface into the prediction engine 20, which will be described in greater detail with respect to FIG. 7, and the result of the prediction engine 20 is consolidated by the genome data module 78.

The update visit information module 76 matches the results of the multi-sensor data 62 with the physical location of retail locations provided in the genome data 78 (from the third party metadata 16).

The create user data module 80 generates one or more visualizations of the data stored in the genome data module 78. For example, visualizations include: clusters of pedestrian traffic, movement by pedestrians, extrapolation of demographics of pedestrians, dwell time of a retail location, ratio of in versus out of a retail location, and effectiveness of influencing traffic from the prediction engine. The resulting information may be stored used by the analytics module 24 and displayed to customers.

Figure 7:
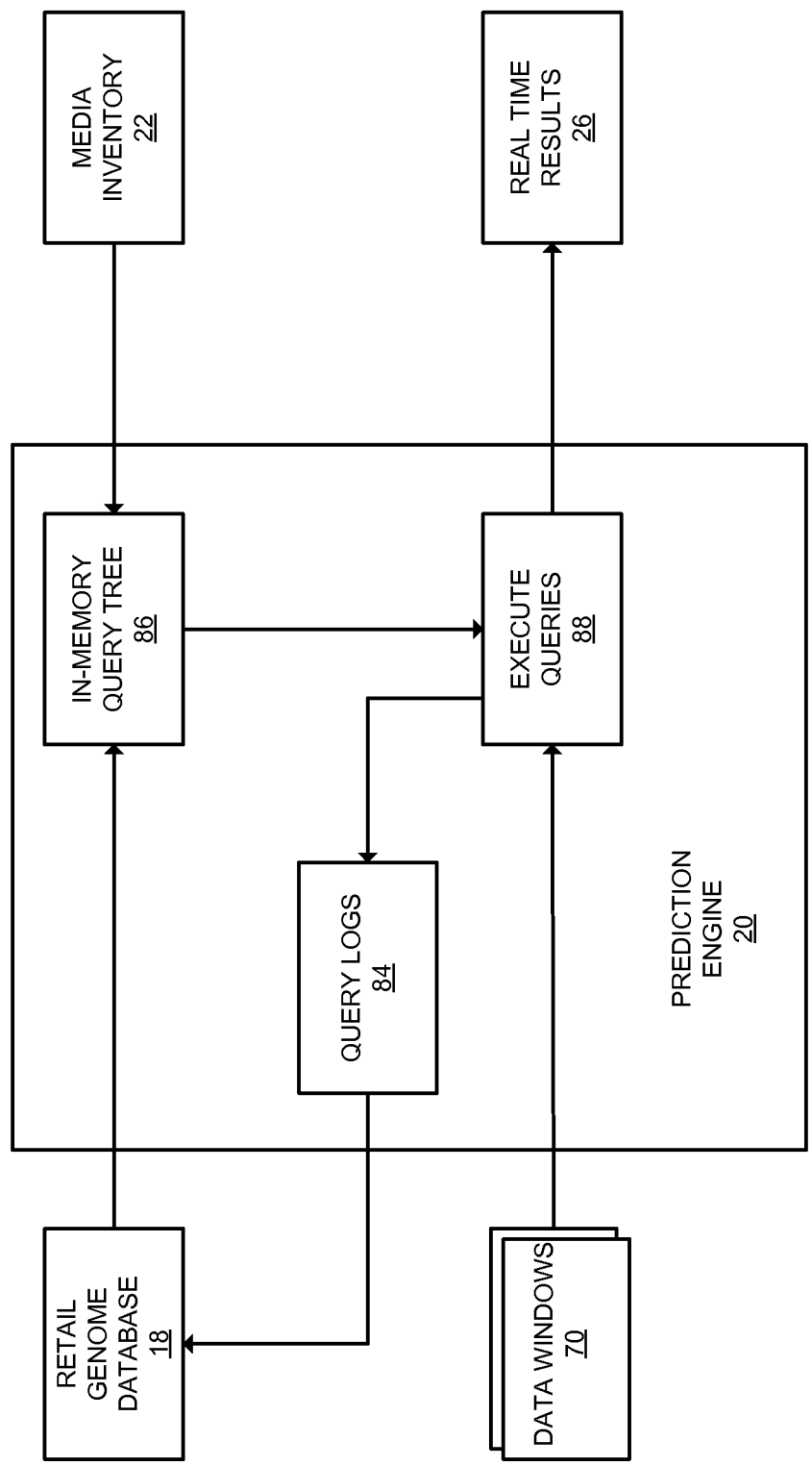
FIG. 7 illustrates the prediction engine of FIG. 1 in more detail according to one embodiment.

FIG. 7 illustrates the prediction engine 20 in more detail according to one embodiment. The prediction engine 20 performs operations including predicting locations and recommending locations and objects of interest. The prediction engine 20 includes a set of software modules that reside at the data processing center including the in-memory query-tree module 86 and the execute queries module 88. The in-memory query-tree module 86 stores a programmatic representation of the questions the prediction engine needs to answer given the arrival of data. The in-memory query tree module 86 executes logic defined programmatically. The input to the in-memory query tree module 86 is the description of the data in the media inventory 22 and/or the retail genome database 18. By way of example, the in-memory query tree module 86 maps the description of the data in the media inventory 22 into conditional logic. A particular item of media from the media inventory 22 is selected if all the conditions defined holds true when the execute query module 88 is initiated.

The execute queries module 88 merges the location data from the data windows 70 and executes the programs defined in the in-memory query-tree module 86. In one embodiment, the execute queries module 88 merges each of the data windows 70 into the in-memory query-tree module 86 at periodic intervals (e.g., no greater than five minutes). The execute queries module 88 executes the conditional logic defined by the in-memory query-tree module 86 with the data from the data windows 70 to obtain the result. The output is a list of media from the media inventory 22 that passes all the conditions defined by the in-memory query tree module 86 at the time the execute queries module 88 completes. The output is stored in the query logs 84 and can be used as input to the retail genome database 78. The input to the retail genome database 78 is considered to be media of relevant interest in or near a retail location as defined in the retail genome database 78. Exemplary operations for selecting and presenting an object of interest to the user based on the demographic information associated with the user will be described with reference to FIG. 15.

Figure 8:
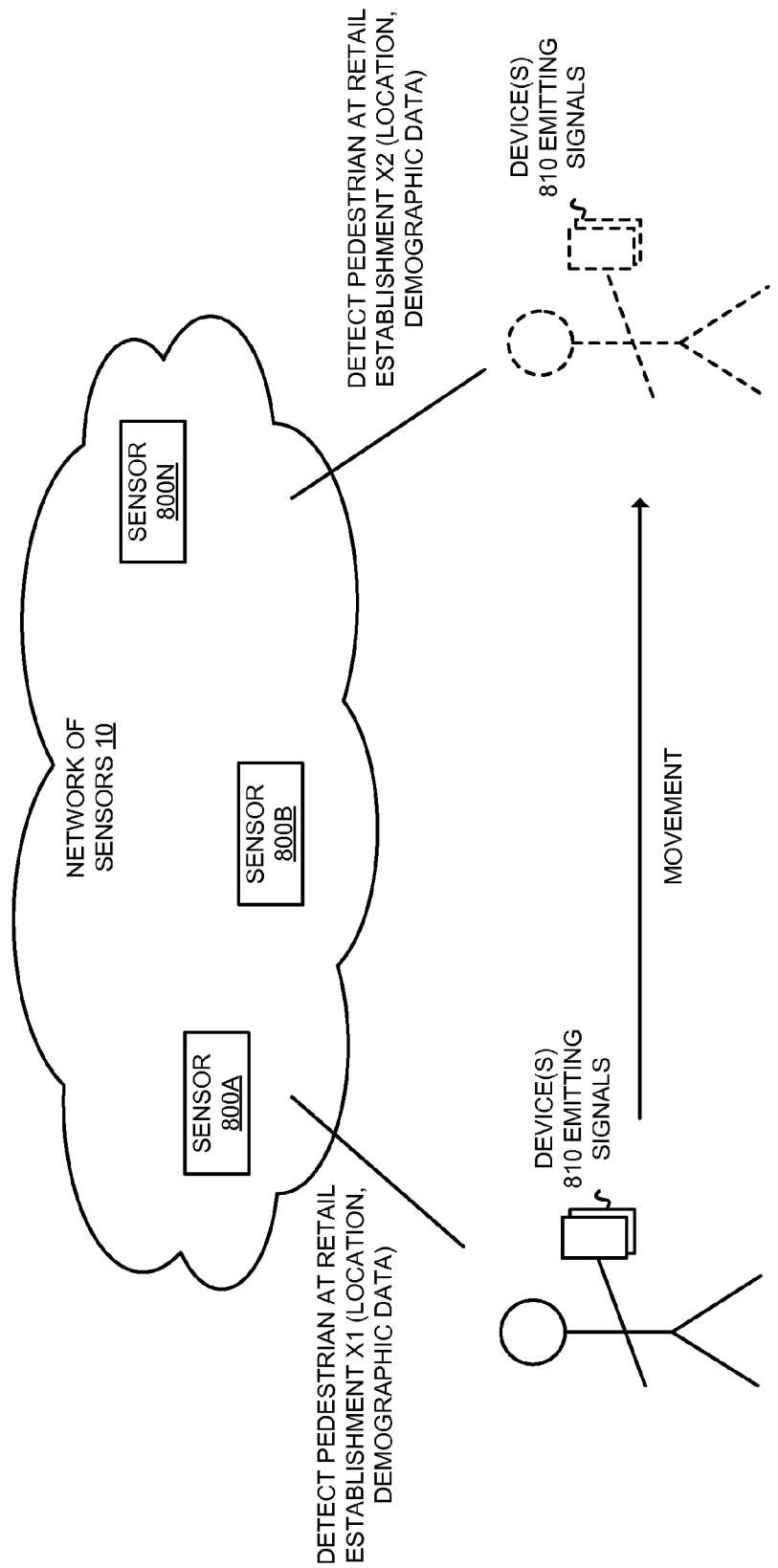
FIG. 8 illustrates detecting user movement in a predefined area according to one embodiment.

FIG. 8 illustrates detecting user movement in a predefined area according to one embodiment. As illustrated in FIG. 8, the network of sensors 10 includes the sensors 800A-N. One or more of the sensors 800A-N detect a pedestrian at a physical location X1 (e.g., a retail establishment) based on signals emitted from one or more devices 810 carried by the pedestrian. For example, the location of the device may be determined based on the signals emitted from the device(s) 810 and the device location can be correlated with the physical location. The location of the pedestrian may be determined as previously described. The device location may also be correlated with the demographic attribute data associated with the physical location X1. Sometime later, one or more of the sensors 800A-N detect the pedestrian at a physical location X2 based on signals emitted from one or more devices 810 carried by the pedestrian. The device location may also be correlated with the demographic attribute data associated with the physical location X1. Based on these two locations, the movement of the pedestrian can be determined.

Figure 9:
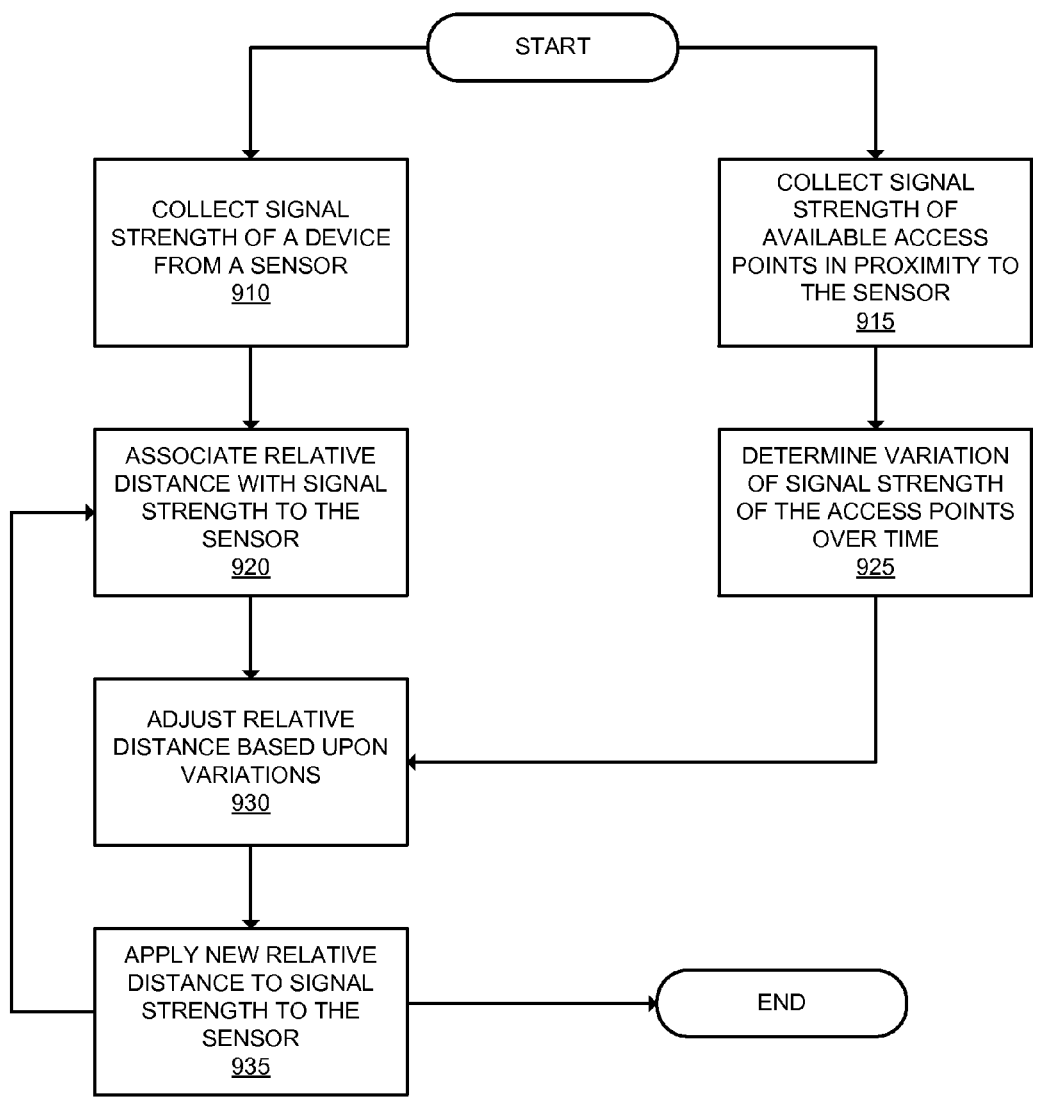
FIG. 9 is a flow diagram that illustrates exemplary operations for determining a distance between a mobile electronic device and a sensor according to one embodiment.

FIG. 9 is a flow diagram that illustrates exemplary operations for determining a distance from a mobile electronic device and a sensor according to one embodiment. At operation 910, the signal strength of a device from a sensor is collected. For example, with reference to FIG. 1, a sensor in the network of sensors 10 detects a device including its relative signal strength to the device and stores that information in the data collection 12.

Sometime before or after operation 910, the signal strength of available access points in proximity to the sensor is collected at operation 915. For example, a sensor in the network of sensors 10 detects one or more stationary access points including its relative signal strength to the access point(s) and stores that information in the data collection 12. The approximate distance may be determined based on the signal strength. Flow moves from operation 915 to operation 925 where the variations of signal strength of the access point(s) over a period of time are determined (the signal strength may fluctuate).

Flow moves from operation 910 to operation 920, where a relative distance between the sensor and the device is associated based on the relative signal strength of the device (a higher signal strength typically indicates that the device is closer to the sensor than a relatively lower signal strength). The distance between the sensor and the device may be determined based on a history or library of distances correlated with signal strength. The signal strength may also be different for different devices (e.g., different manufacturers and/or different models). The distance between the sensor and the device may alternatively be estimated based on the association between distance(s) between the sensor and one or more access points and their relative signal strengths (assuming that the sensor and the access point(s) have not been physically moved when their relative distance has been determined).

Flow then moves to operation 930, where the relative distance between the device and the sensor is adjusted based upon the variations of signal strength of the access point(s) as determined in operation 920. For example, if the signal strength of the access point(s) reduces over a certain period of time, it is likely that the signal strength of the device(s) will reduce in a relative way (assuming that the distance between the sensor and the access point(s) remain relatively unchanged); similarly if the signal strength of the access point(s) increases, it is likely that the signal strength of the device(s) will increase in a relative way. Thus, variations in the signal strength data of the access points may be used to adjust the relative distance measurement between a sensor and detected device. Flow then moves to operation 935 where the new relative distance is applied to the signal strength of the sensor such that future calculations (e.g., the calculations performed in operation 920) will use the newly calibrated distance and signal strength association.

Figure 10:
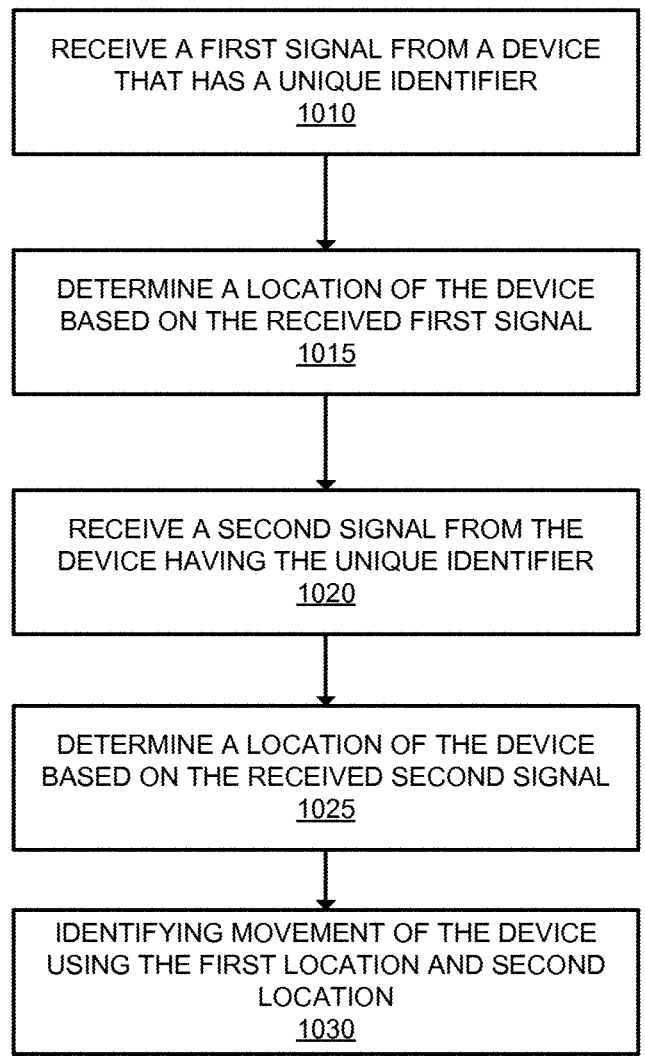
FIG. 10 is a flow diagram that illustrates exemplary operations for detecting user movement according to one embodiment.

FIG. 10 is a flow diagram that illustrates exemplary operations for detecting user movement according to one embodiment. The operations of the FIG. 10 will be described with reference to the exemplary embodiment of FIG. 8. However, it should be understood that the operations of FIG. 10 can be performed by embodiments of the invention other than those discussed with reference to FIG. 8, and the embodiments discussed with reference to FIG. 8 can perform operations different than those discussed with reference to FIG. 10.

At operation 1010, one or more sensors 800 receive a first signal from a mobile electronic device that has a unique identifier (e.g., a MAC address, etc.). The mobile electronic device may be a WiFi device, a Bluetooth device, a cellular device, or other radio device. Flow then moves to operation 1015 where the location of the device is determined based on the signal. In one embodiment, the location is estimated based upon the range of the sensor and the relative signal strength with the device. In one embodiment, the location is obtained by triangulating multiple signals received at multiple sensors from the same device. Flow then moves to operation 1020 where one or more sensors 800 receive a second signal from the mobile electronic device. Next, at operation 1025, the location of the device is determined based on the second signal. Based on the two location points, movement of the device is identified in operation 1030.

Figure 11:
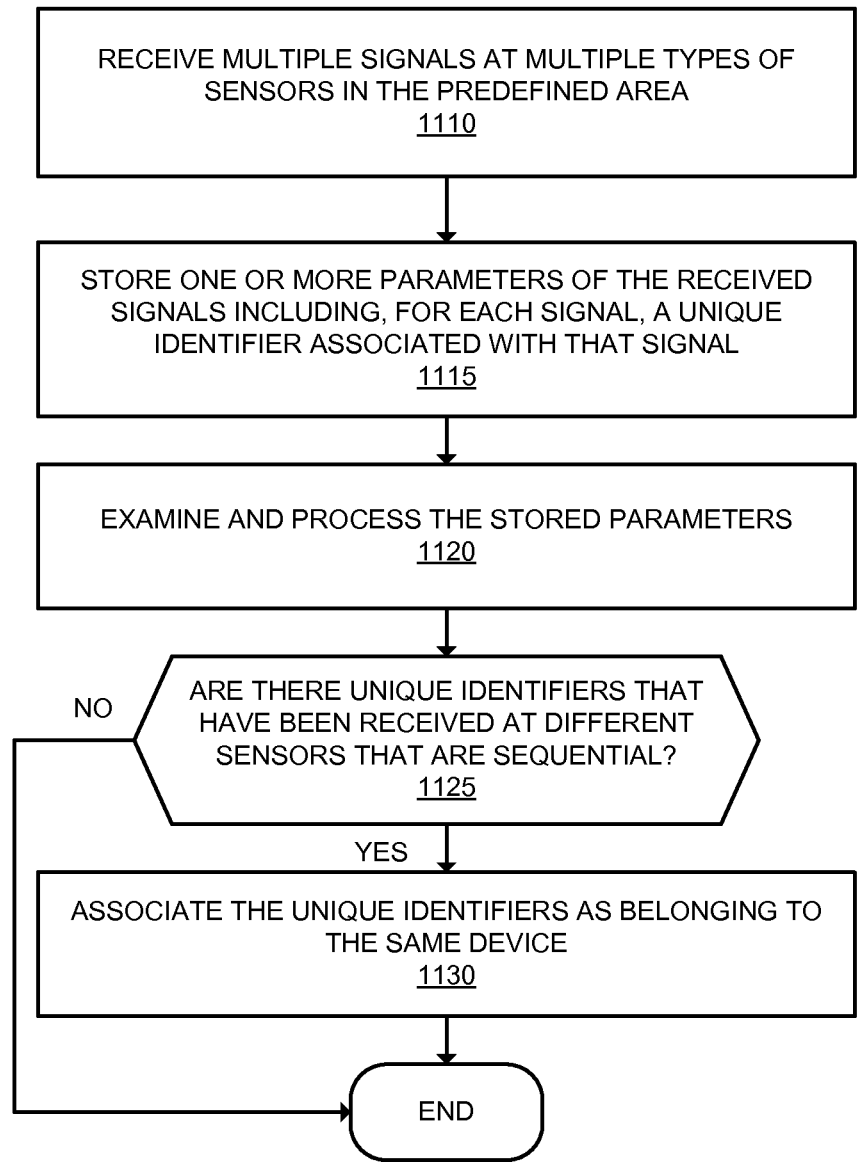
FIG. 11 is a flow diagram that illustrates exemplary operations for associating unique device identifiers of a single mobile electronic device according to one embodiment.

FIG. 11 is a flow diagram that illustrates exemplary operations for associating unique identifiers (e.g., MAC addresses) from a single mobile electronic device according to one embodiment. At operation 1110, multiple sensors 10 of different sensor types (e.g., WiFi detector, RF receiver, Bluetooth receiver) receive multiple signals. The multiple sensors are part of the same predefined area (e.g., part of the same network of sensors). Each of the signals includes a unique identifier (e.g., a MAC address) of the device that transmitted the signal. Next, flow moves to operation 1115 and the collected information from the signals is stored (e.g., in the data collection 12). The collected information may include for each signal the unique device identifier. The collected information may also include other data (e.g., time of detection, signal strength). Flow then moves to operation 1120.

At operation 1120, the stored parameters are examined and processed. For example, with reference to FIG. 4, one or more processes (e.g., the reduce sample size process 54, one or more of the extrapolate data processes 56) may be performed. By way of a specific example, the extrapolate MAC addresses process 426 is performed. Flow then moves to operation 1125 where it is determined whether there are unique device identifiers that have been received at different sensor types that are sequential. For example, a smartphone may include a WiFi transceiver, a cellular transceiver, and/or a Bluetooth transceiver, which each have their own unique MAC address that are often sequential. If there are, then flow moves to operation 1130 and those unique device identifiers are associated as belonging to the same mobile electronic device. If there are not, then the operations end. In one embodiment, those unique device identifiers are stored in a device profile created for the device. The device profile may also include other items such as demographic attribute information, dwell time in retail location(s), ratio of in versus out of retail location(s), history of visit data, etc.

In addition to determining whether unique device identifiers are sequential, the operations may also include determining whether those sequential device identifiers were detected in close proximity of time (e.g., within one hour, a day, etc.). A long period of time between detecting a unique device identifier that is sequential to another detected identifier increases the chances that the identifiers are on separate devices. In a relatively short period of time, it is unlikely that sequential device identifiers that are on separate mobile electronic devices (e.g., two cell phones) will be detected in the same sensor network.

Figure 12:
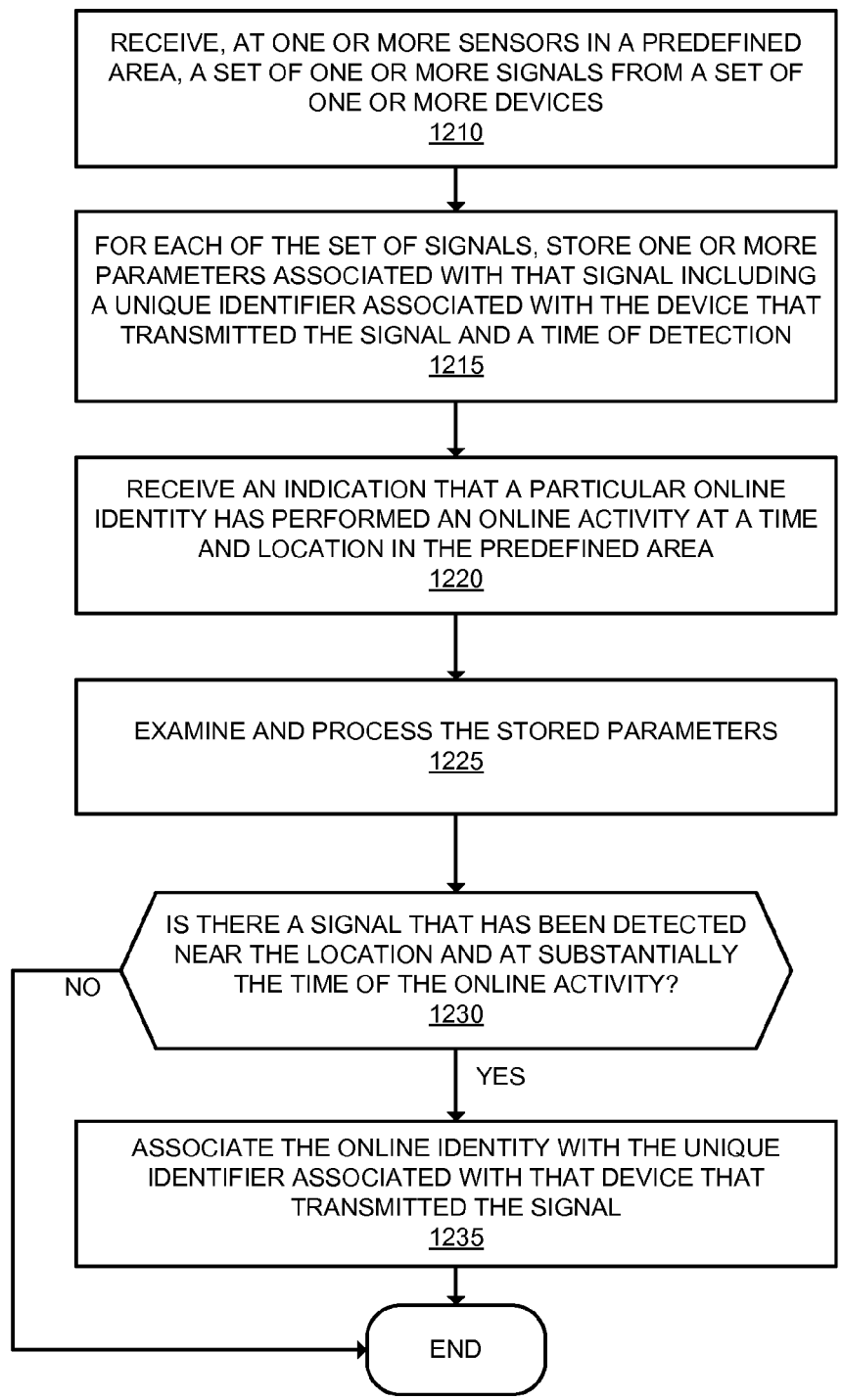
FIG. 12 is a flow diagram that illustrates exemplary operations for associating a unique online identifier with one or more unique device identifiers according to one embodiment.

FIG. 12 is a flow diagram that illustrates exemplary operations for associating a unique online identifier with one or more unique device identifiers according to one embodiment. At operation 1210, one or more sensors in a predefined area (e.g., part of the same sensor network) receive a set of one or more signals from a set of one or more devices. Each of the signals includes a unique device identifier of the device that transmitted the signal. Next, flow moves to operation 1215 and the collected information from the signals is stored (e.g., in the data collection 12). The collected information may include for each signal the unique device identifier and a time of detection. The collected information may also include other data (e.g., signal strength). Flow then moves to operation 1220.

At operation 1220, an indication is received that a particular online identity has performed an online activity at a time and location in the predefined area. The indication may be received from an external system. By way of example, the online activity may be a user registering their presence at a location in the predefined area (e.g., at a retail establishment, in a particular section of a retail establishment), a user participating in a treasure hunt that guides the user to predefined locations of the predefined area at certain times, and/or a user causing their mobile electronic device to emit predefined signal patterns. The indication also may include an identifier of the online identifier (e.g., a username). While operation 1220 has been illustrated as following operation 1215, in other embodiments operation 1220 precedes operation 1210 and/or 1215. Flow moves from operation 1220 to operation 1225.

At operation 1225, the stored parameters are examined and processed. For example, with reference to FIG. 4, one or more processes (e.g., the reduce sample size process 54, one or more of the extrapolate data processes 56, and one or more of the multiple sensor data processes 60) may be performed. By way of a specific example, the associate unique identifier process 438 is performed. Flow then moves to operation 1230.

At operation 1230, it is determined whether there is a signal that has been detected near the location (e.g., a zone or latitude/longitude point) and at substantially the time of the online activity. If there is a match, then flow moves to operation 1235 and the online identity and the unique device identifier (or a hash of the unique device identifier) of the matching signal are associated. In one embodiment, the association is stored in a profile created for the device that may also include other items such as demographic attribute information, dwell time in retail location(s), ratio of in versus out of retail location(s), history of visit data, etc. If there is not a match, the operations end. In one embodiment, to reduce false positives, multiple matching of online activity and signal data may be required. For example, in a circumstance where a user is participating in a treasure hunt that requires the user to perform multiple identified online activities at predefined locations, in one embodiment multiple ones of those online activities may be required to match the signal data in order to correlate the online identifier with the appropriate device identifier(s).

Figure 13:
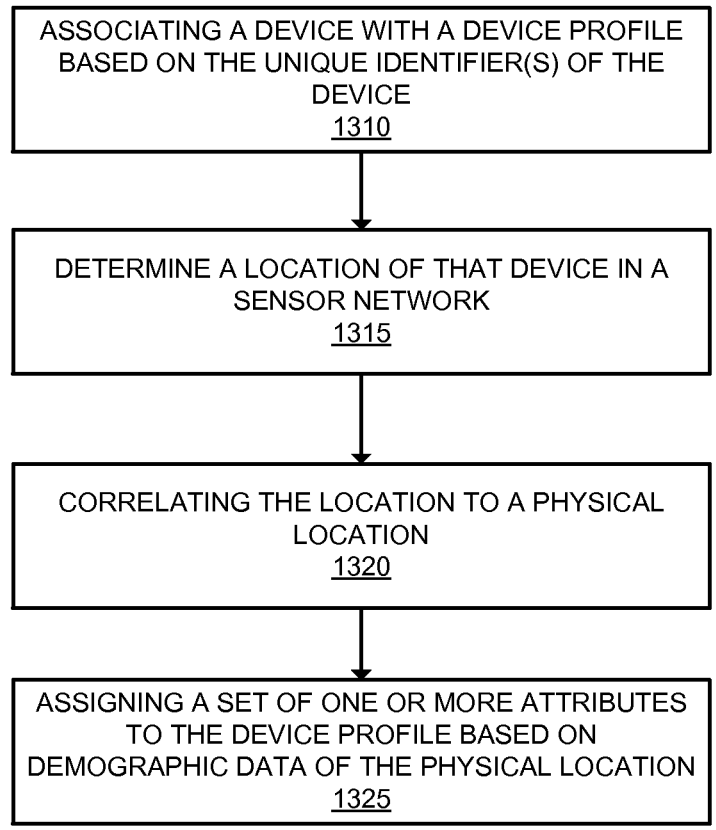
FIG. 13 is a flow diagram illustrating exemplary operations for assigning a set of one or more attributes to a user according to one embodiment.

FIG. 13 is a flow diagram illustrating exemplary operations for assigning a set of one or more attributes to a device according to one embodiment. In one embodiment the operations described with respect to FIG. 13 are performed by the heuristics module 14. At operation 1310, a device is associated with a device profile based on the unique identifier(s) of the device. As described above with reference to FIG. 12, there may be multiple unique identifiers of a single device associated with a device profile (e.g., multiple MAC addresses may be associated with the device). Instead of associating the unique identifier(s) in the device profile, a hash or other encrypted version of the unique identifier(s) may be associated in the device profile. Flow then moves to operation 1315.

At operation 1315, the location of that device in the sensor network is determined. The location may be determined by operations previously described herein. Next, flow moves to operation 1320 where the location is correlated to a physical location (e.g., a retail establishment). The physical location is associated with demographic information. For example, the third party metadata 16 may include the demographic information for the physical location. Next, flow moves to operation 1325 and one or more attributes are assigned to the device profile based at least in part on the demographic data of the physical location. The attributes may also be assigned based on one or more of; characteristics of the device in the device profile (e.g., manufacturer of the device), prior visit information, length of stay in different location(s), how often the device visits different location(s), etc. The attribute information assigned to the device profile may be used, for example, for recommending an object of interest to the user using the device and/or recommending a location of interest for the user using the device.

Figure 14:
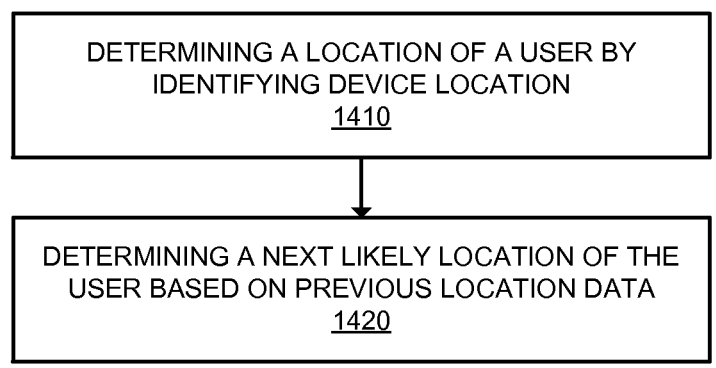
FIG. 14 is a flow diagram that illustrates exemplary operations for predicting user location according to one embodiment.
Figure 15:
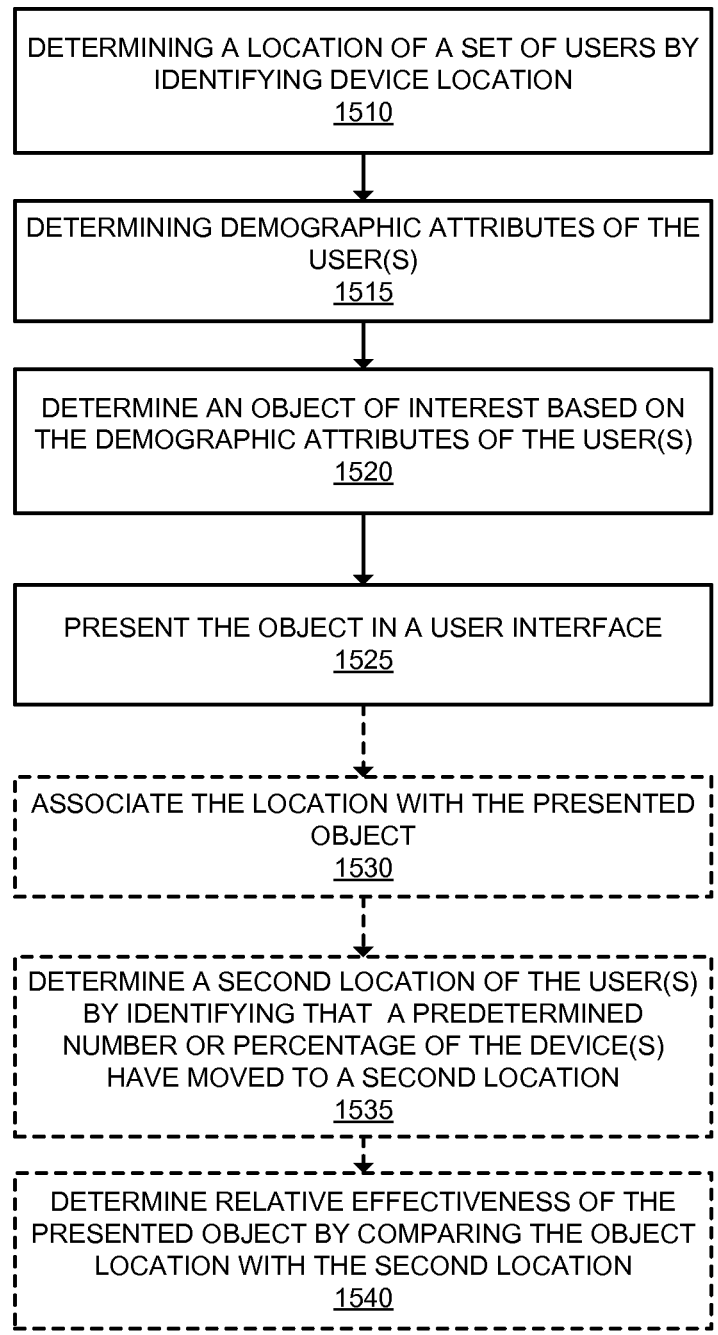
FIG. 15 is a flow diagram that illustrates exemplary operations for selecting and presenting an object of interest to a user based on the demographic information associated with the user according to one embodiment.

FIG. 14 is a flow diagram that illustrates exemplary operations for predicting user location according to one embodiment. At operation 1410, the location of a user is determined by identifying the location of a mobile electronic device. The location may be determined by operations previously described herein. Next, at operation 1415, the next likely location of the user is determined based on previous location data. For example, based on the log of prior visits data from the retail genome database 18 and the current location of the device, the next likely location of the device may be determined FIG. 15 is a flow diagram that illustrates exemplary operations for selecting and presenting an object of interest to a set of one or more users based on the demographic information associated with the set of users according to one embodiment. At operation 1510, the location of the set of users is determined by identifying the location of one or more mobile electronic devices. The location may be determined by operations previously described herein. Next, at operation 1515, the demographic attribute information associated with the set of users is determined. For example, the profile(s) associated with the detected devices are accessed and the demographic attribute information is read.

Flow then moves to operation 1520 where an object of interest is determined based on the demographic attribute information of the set of users. The object of interest may be stored in the media inventory 22 and can be video, audio, banners, pictures, etc. Next, flow moves to operation 1525 and the object is presented in a user interface for the user(s). The user interface may be a video billboard near the location of the user(s), an audio billboard near the location of the user(s), and/or the mobile electronic device(s) associated with the user(s). In one embodiment, the operations for presenting an object of interest to the set of users are performed substantially in real-time such that selected objects are presented to the user(s) in near real-time when the device(s) are detected near a user interface such as a video billboard, audio billboard, or other suitable user interface. In some embodiments, flow then moves to operation 1530.

At operation 1530, the location of the device(s) or the user interface is associated with the selected object (the "object location"). Next, at operation 1535, a second location of the set of users is determined by identifying that a predetermined number or percentage of the set of mobile electronic devices have moved to the second location (e.g., a majority of the device(s) have moved to the second location). Flow then moves to operation 1540 and the relative effectiveness of the presented object is determined by comparing the object location with the second location. For example, the presented object may include an advertisement related to a product offered in a particular part of a commerce district (the second location). If the user moves to the second location, then the advertisement may be effective. As another example, the traffic level of the second location after the object has been presented a number of times may be compared with the traffic level of the second location prior to the object being presented. A more effective object will increase traffic more to the second location than a relatively less effective object. It should be understood that determining the relative effectiveness of the presented object can be performed by real-time processing or processing performed at a later time (e.g., days, weeks, months after the object has been presented).

The advantages of embodiments of the present invention include, without limitations, that it requires no change in human behavior for the invention to be effective. In at least certain embodiments, pedestrian traffic is passively detected, pedestrian traffic is tracked anonymously (e.g., the unique identifier may be encrypted), and pedestrian traffic can be detected and analyzed in real-time. It uniquely identifies devices. It is low cost and low maintenance thus can be distributed rapidly.

The techniques shown in the figures can be implemented using code and data stored and executed on one or more electronic devices (e.g., one or more computing devices in a data processing center). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving a set of packets from at least one mobile electronic device sensor located in a predefined area, wherein the set of packets includes data detected by the at least one sensor of at least a first mobile electronic device;
   storing at least a portion of the data that is included in the set of packets as a stored portion of data, wherein the stored portion of data includes a plurality of unique device identifiers that belong to the first mobile electronic device;
   determining that at least two of the unique device identifiers are sequential;
   responsive to determining that at least two of the unique device identifiers are sequential, associating a set of values based on the at least two unique device identifiers as belonging to a same first mobile electronic device;
   determining a set of one or more device locations that the first mobile electronic device has been based at least in part on the data detected by the at least one sensor for the at least two unique device identifiers; and
   assigning attribute information to a device profile based on demographic data of a set of one or more physical locations that correlate to the set of device locations, wherein the device profile is created for the first mobile electronic device.

2. The method of claim 1, wherein the stored portion of data further includes detection times of the at least one mobile electronic device, and wherein prior to associating the at least two unique device identifiers, determining that the at least two unique device identifiers were detected within a predefined period of time.

3. The method of claim 1, wherein the set of values includes encrypted versions of the at least two unique device identifiers.

4. The method of claim 1, wherein associating the at least two unique device identifiers includes performing the following:
   encrypting each of the at least two unique device identifiers; and
   associating each of the at least two encrypted unique device identifiers as belonging to the first mobile electronic device.

5. The method of claim 1, further comprising: storing those unique identifiers in fall the device profile.

6. The method of claim 1, wherein the at least one sensor is selected from the group consisting of a WiFi detector, a Bluetooth receiver, and a Radio Frequency (RF) receiver.

7. The method of claim 1, wherein the mobile electronic device is selected from the group consisting of a WiFi enabled device, a cellular phone, and a Bluetooth enabled device.

8. An apparatus in a data processing center, comprising:
   a set of one or more processors;
   a non-transitory machine-readable storage medium that stores instructions, that when executed by the set of processors, cause the set of processors to perform the following:
     receive a set of packets from at least one mobile electronic device sensor located in a predefined area, wherein the set of packets includes data detected by the at least one sensor of at least a first mobile electronic device;
     store at least a portion of the data that is included in the set of packets as a stored portion of data wherein the stored portion of data includes a plurality of unique device identifiers that belong to the first mobile electronic device;
     determine that at least two of the unique device identifiers are sequential;
     responsive to a determination that at least two of the unique device identifiers are sequential, associate a set of values based on the at least two unique device identifiers as belonging to a same first mobile electronic device;
     determine a set of one or more device locations that he first mobile electronic device has been based at least in part on the data detected by the at least one sensor for the at least two unique device identifiers; and
     assign attribute information to a device profile based on demographic data of a set of one or more physical locations that correlate to the set of device locations, wherein the device profile is created for the first mobile electronic device.

9. The apparatus of claim 8, wherein the stored portion of data further includes detection times of the at least one mobile electronic device, and wherein prior to an association of the at least two unique device identifiers, the set of processors are further to determine that the at least two unique device identifiers were detected within a predefined period of time.

10. The apparatus of claim 8, wherein the set of values includes encrypted versions of the at least two unique device identifiers.

11. The apparatus of claim 8, wherein the set of processors is configured to associate the at least two unique device identifiers by performing the following:
    encrypting each of the at least two unique device identifiers; and
    associating each of the at least two encrypted unique device identifiers as belonging to the first mobile electronic device.

12. The apparatus of claim 8, further comprising instructions that when executed by the set of processors, cause the set of processors to store those unique identifiers in the device profile.

13. The apparatus of claim 8, wherein the at least one sensor is selected from the group consisting of a WiFi detector, a Bluetooth receiver, and a Radio Frequency (RF) receiver.

14. The apparatus of claim 8, wherein the mobile electronic device is selected from the group consisting of a WiFi enabled device, a cellular phone, and a Bluetooth enabled device.

* * * * *

UNITED STATES PATENT AND TRADEMARK OFFICE
CERTIFICATE OF CORRECTION

PATENT NO.        : 9,438,677 B2
APPLICATION NO.   : 14/253787
DATED             : September 6, 2016
INVENTOR(S)       : Leung et al.

Page 1 of 1

It is certified that error appears in the above-identified patent and that said Letters Patent is hereby corrected as shown below:

On the Title Page

Column 1, item (72), delete "Steve", and insert --Steven--, therefor.

In the Claims

In Column 15, Line 56, after "those unique identifiers", delete "in fall the", and insert --in the--, therefor.
In Column 16, Line 24, after "more device locations that", delete "he", and insert --the--, therefor.

Signed and Sealed this
Ninth Day of May, 2017

Michelle K. Lee
*Director of the United States Patent and Trademark Office*